(12) United States Patent
Byun et al.

(10) Patent No.: US 8,614,018 B2
(45) Date of Patent: Dec. 24, 2013

(54) SECONDARY BATTERY

(75) Inventors: Sangwon Byun, Suwon-si (KR); Byungkyu Ahn, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 406 days.

(21) Appl. No.: 12/923,945

(22) Filed: Oct. 15, 2010

(65) Prior Publication Data

US 2011/0183165 A1    Jul. 28, 2011

(30) Foreign Application Priority Data

Jan. 26, 2010    (KR) .................... 10-2010-0007036

(51) Int. Cl.
*H01M 2/26*    (2006.01)

(52) U.S. Cl.
USPC ........................ 429/161; 429/163; 429/164

(58) Field of Classification Search
None
See application file for complete search history.

(56) References Cited

U.S. PATENT DOCUMENTS

| 2006/0019158 A1* | 1/2006 | Mori et al. | 429/174 |
| 2006/0024573 A1* | 2/2006 | Yim et al. | 429/174 |
| 2006/0093903 A1* | 5/2006 | Hong et al. | 429/161 |
| 2009/0317665 A1 | 12/2009 | Maeng et al. | |

FOREIGN PATENT DOCUMENTS

| JP | 08-185850 A | 7/1996 |
| KR | 10-2009-0132926 A | 12/2009 |

OTHER PUBLICATIONS

Korean Notice of Allowance in KR 10-2010-0007036, dated Apr. 20, 2011 (Byun, et al.).

* cited by examiner

*Primary Examiner* — Cynthia K. Walls
(74) *Attorney, Agent, or Firm* — Lee & Morse, P.C.

(57) ABSTRACT

A secondary battery includes an electrode assembly in a case, the electrode assembly including a positive electrode, a negative electrode, and a separator, a cap assembly connected to the case and including a cap plate, first and second terminals through the cap plate, and a shorting member selectively connecting the first terminal and the cap plate, and at least one electrode lead tab including a terminal-junction part electrically connected to a terminal, an electrode assembly-junction part electrically connected to an electrode in accordance with the terminal, and a fuse part electrically connected between the terminal-junction part and the electrode assembly-junction part, the fuse part being configured to break when the first and second terminals are electrically connected, and the fuse part extending at an angle other than zero with respect to a longitudinal extension line of the terminal junction part and/ or the electrode assembly-junction part.

19 Claims, 5 Drawing Sheets

SECONDARY BATTERY

BACKGROUND

1. Field

Example embodiments relate to a secondary battery. More particularly, example embodiments relate to a secondary battery having a structure configured to interrupt excessive current therethrough.

2. Description of the Related Art

In general, a secondary battery refers to a battery adapted to be charged, discharged, and recharged, while a primary battery cannot be recharged. For example, a low-power secondary battery may be used in small-sized portable electronic equipment, e.g., cellular phones, laptop computers, camcorders, etc., while a high-power secondary battery may be used as a power source for driving a motor of an apparatus requiring a high power, e.g., in a hybrid vehicle. A high-power secondary battery may include an aqueous electrolyte with a high energy density. For example, the high power secondary battery may include a plurality of secondary batteries electrically connected to each other in series.

A conventional secondary battery may have, e.g., a cylindrical shape or a polygonal shape. For example, as compared with a cylindrically-shaped secondary battery, it may be difficult to provide a discharging structure or a current shutting off structure corresponding to an increased internal pressure in a polygonally-shaped secondary battery.

SUMMARY

Embodiments are therefore directed to a secondary battery, which substantially overcomes one or more of the problems due to the limitations and disadvantages of the related art.

It is therefore a feature of an embodiment to provide a secondary battery having structural members configured to contact each other to interrupt current therethrough, thereby enhancing stability and safety of the battery.

It is another feature of an embodiment to provide a secondary battery including a lead tab having a fuse part with excellent mechanical strength against a lateral bending force, thereby inhibiting deformation of a lead tab caused by external force.

At least one of the above and other features and advantages may be realized by providing a secondary battery, including an electrode assembly in a case, the electrode assembly including a positive electrode, a negative electrode, and a separator between the positive electrode and the negative electrode, a cap assembly connected to the case, the cap assembly including a cap plate, a first terminal through the cap plate, a second terminal through the cap plate and electrically connected to the cap plate, and a shorting member selectively connecting the first terminal and the cap plate, and at least one electrode lead tab in the case, the electrode lead tab including a terminal junction part electrically connected to the first or second terminal, an electrode assembly-junction part electrically connected to the positive or negative electrode in accordance with the terminal connected to the terminal junction part, and a fuse part electrically connected between the terminal-junction part and the electrode assembly-junction part, the fuse part being configured to break when the first and second terminals are electrically connected, and the fuse part extending at an angle other than zero with respect to a longitudinal extension line of the terminal junction part and/or the electrode assembly-junction part.

The electrode assembly-junction part and the terminal junction part may be non-parallel. The fuse part may be on a region of the terminal junction part adjacent to the electrode assembly. The fuse part of the lead tab may include a first bridging piece and a second bridging piece, and each of the first bridging piece and the second bridging piece may be connected to the terminal junction part and the electrode assembly-junction part through both end portions thereof, and an extension direction of the first bridging piece may differ from that of the second bridging piece.

The first and second bridging pieces may be spaced apart from each other and define an acute angle therebetween. The first and second bridging pieces may extend from a central portion of an edge of the electrode assembly-junction part or from a central portion of an edge of the terminal junction part in different directions. Alternatively, the first bridging piece of the fuse part may be extended from a central portion of an end of the terminal junction part toward a first side portion of an end of the electrode assembly-junction part, and the second bridging piece may be extended from the central portion of the end of the terminal junction part toward a second side portion (opposite to the first side portion) of an end of the electrode assembly-junction part.

The fuse part of the lead tab may include one bridging piece making a certain angle with longitudinal extension lines of the terminal junction part and the electrode assembly-junction part. The bridging piece may extend diagonally between the electrode assembly-junction part and the terminal junction part. A structural width of the fuse part along a direction perpendicular to a longitudinal direction of the terminal junction part may be larger than a current path width of the fuse path. The secondary battery may be coplanar with the terminal junction part.

At least one of the above and other features and advantages may also be realized by providing a secondary battery, including an electrode assembly in a case, the electrode assembly including a positive electrode, a negative electrode, and a separator between the positive electrode and the negative electrode, a cap assembly connected to the case, the cap assembly including a cap plate, a first terminal through the cap plate, a second terminal through the cap plate and electrically connected to the cap plate, and a shorting member selectively connecting the first terminal and the cap plate, and at least one electrode lead tab in the case, the electrode lead tab including a terminal junction part electrically connected to the first or second terminal, an electrode assembly-junction part electrically connected to the positive or negative electrode in accordance with the terminal connected to the terminal junction part, and an inclined fuse part electrically connected between the terminal-junction part and the electrode assembly-junction part, the fuse part being configured to break when the first and second terminals are electrically connected, and the fuse part including a first bridging piece and a second bridging piece inclined at an angle other than zero with respected longitudinal extension lines of the terminal junction part and/or the electrode assembly-junction part.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
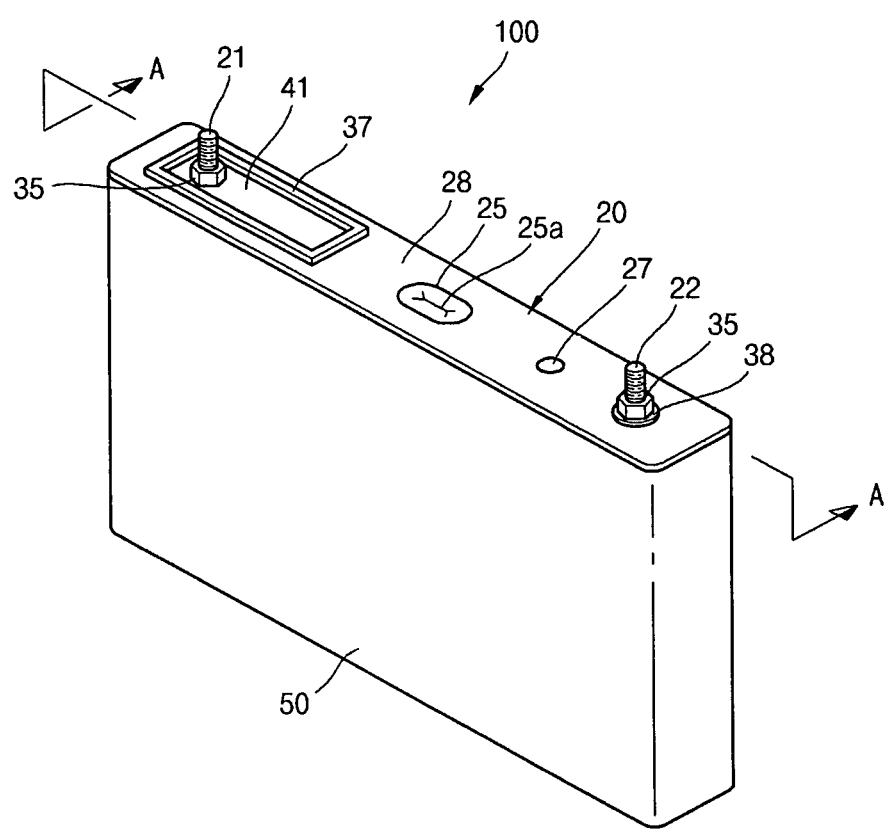
FIG. 1 illustrates a perspective view of a secondary battery according to an embodiment.

Korean Patent Application No. 10-2010-0007036, filed on Jan. 26, 2010, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when a layer or element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Like reference numerals refer to like elements throughout.

Hereinafter, a polygonal type lithium ion secondary battery is illustrated as an example. However, example embodiments are not limited thereto, but can be applied to the various kinds of secondary batteries, e.g., a lithium polymer battery, a cylinder type secondary battery, and the like.

Figure 2:
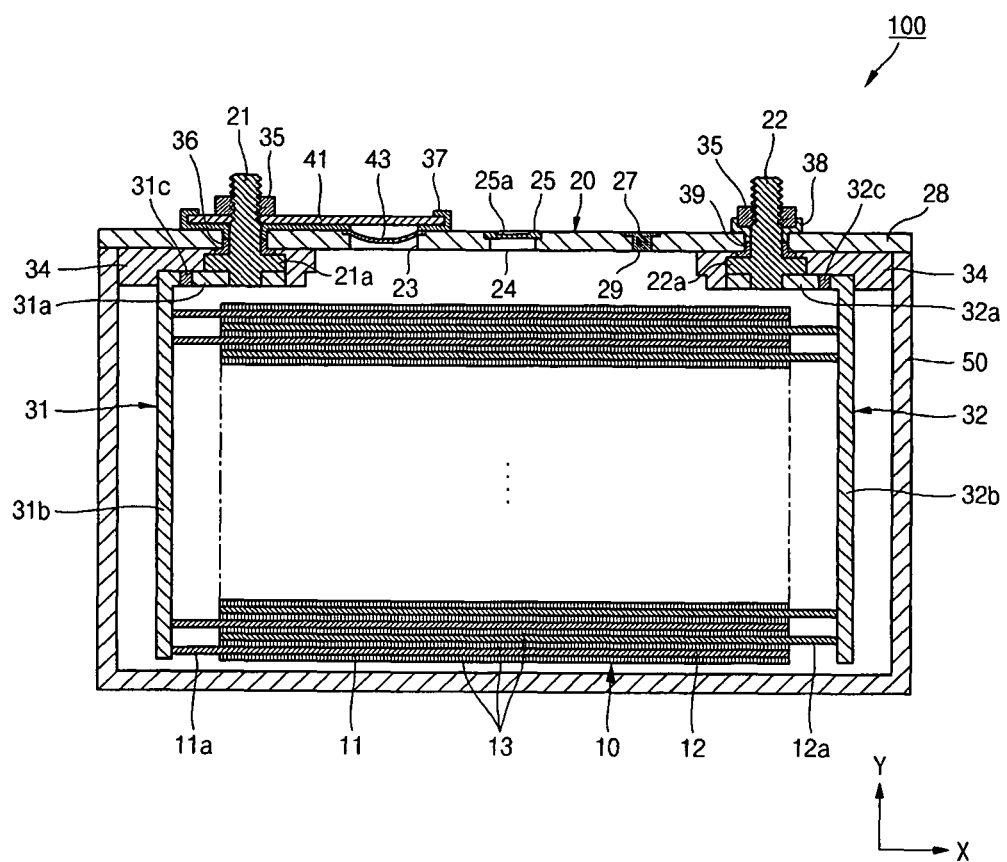
FIG. 2 illustrates a cross-sectional view taken along line A-A of FIG. 1.

FIG. 1 illustrates a perspective view of a secondary battery according to an embodiment. FIG. 2 illustrates a cross-sectional view along line A-A of FIG. 1.

Referring to FIGS. 1 and 2, a secondary battery 100 according to an embodiment may include an electrode assembly 10, a case 50 in which the electrode assembly 10 is received, and a cap assembly 20 coupled to an opening of the case 50. The electrode assembly 10 may include a positive electrode 11, a negative electrode 12, and an insulating separator 13 disposed between the positive electrode 11 and the negative electrode 12.

Each of the positive electrode 11 and the negative electrode 12 may include a coating portion formed by applying an active material on a collector, i.e., on a thin metal foil, and a non-coating portion (11a, 12a), i.e., a region on which active material is not applied. The positive electrode non-coating portion 11a may be formed on a first end portion of the positive electrode 11, and the negative electrode non-coating portion 12a may be formed on a second end portion of the negative electrode 12, i.e., an end opposite to the first end portion of the positive electrode 11. In addition, the separator 13 may be formed of an insulating material, and may be disposed between the positive electrode 11 and the negative electrode 12. A plurality of electrode units, i.e., each of which may include the positive electrode 11, the separator 13 and the negative electrode 12, may be wound to form the electrode assembly 10, or the electrode assembly 10 may be formed by laminating a plurality of sheet-shaped electrode units.

The case 50 may have, e.g., an approximately rectangular shape, and may have one open side. The case 50 may have a space formed therein for receiving the electrode assembly 10.

The cap assembly 20 may be mounted in the open side of the case 50. The cap assembly 20 may include a cap plate 28 covering, e.g., sealing, the open side of the case 50, and a first terminal 21 and a second terminal 22 mounted on the cap plate 28. Terminal holes (not shown) may be formed through the cap plate 28, so first end portions of the first and second terminals 21 and 22 may extend through the cap plate 28 to be exposed outside of the case 50, and second end portions of the first and second terminals 21 and 22, i.e., ends opposite the first ends, may be inside the case 50 electrically connected to the positive electrode 11 and the negative electrode 12, respectively, via respective first and second lead tabs 31 and 32 in the case 50. The first and second lead tabs 31 and 32 will be described in more detail below with reference to FIG. 3.

A vent hole 24 and an electrolyte-inlet 29 closed by a sealing cork 27 may be formed on the cap plate 28. A vent plate 25 may be mounted into the vent hole 24, and may have a notch 25a formed thereon for enabling the vent hole to be opened under a predetermined pressure.

A first gasket 36 may be disposed between the first terminal 21 and the cap plate 28, and a second gasket 39 may be disposed between the second terminal 22 and the cap plate 28 to seal a gap between each terminal and the cap plate 28.

The positive electrode lead tab 31 may electrically connect the first terminal 21 and the positive electrodes 11. A shorting tab 41 may be electrically connected to the first terminal 21, and may be provided above the cap plate 28. An insulating member 37 may be provided between the shorting tab 41 and the cap plate 28 for electrically insulating the shorting tab 41 and the cap plate 28.

On the second terminal 22, a connecting plate 38 may be provided for electrically connecting the second terminal 22 and the cap plate 28. The second terminal 22 may be inserted into the connecting plate 38, and the connecting plate 38 may be closely contacted with the cap plate 28 through a nut 35 screw-coupled with an upper threaded portion of the second terminal 22.

The cap assembly 20 may further include a shorting member 43. The shorting member 43 may be formed in a shorting hole 23 within the cap plate 28, e.g., connect two portions of the cap plate 28, and may be capable of connecting the positive electrode 11 and the negative electrode 12. When an internal pressure of the secondary battery 100 is increased, the shorting member 43 may deform, e.g., transform, to contact the first shorting tab 41, thereby connecting the first shorting tab 41 and a second shorting tab, i.e., the cap plate 28 electrically connected to the negative electrode 12.

The shorting hole 23 may be formed in the cap plate 28, so the shorting member 43 may be disposed in the shorting hole 23 between the insulating member 37 and the cap plate 28. The shorting member 43 may be formed of a semi-conductive plate including a curved central portion, i.e., convexed downward, and a periphery portion fixed to the cap plate 28.

The first and second lead tabs 31 and 32 may electrically connect respective first and second terminals 21 and 22 to respective positive and negative electrodes 11 and 12. The first and second lead tabs 31 and 32 may refer to positive and negative electrode tabs, respectively, and may have a substantially same structure. The first and second lead tabs 31 and 32 may include respective first and second terminal-junction parts 31a and 32a, first and second electrode assembly-junction parts 31b and 32b extended from the terminal junction parts 31a and 32a, and first and second fuse parts 31c and 32c formed between respective terminal junction parts 31a and 32a and electrode assembly-junction parts 31b and 32b.

Figure 3:
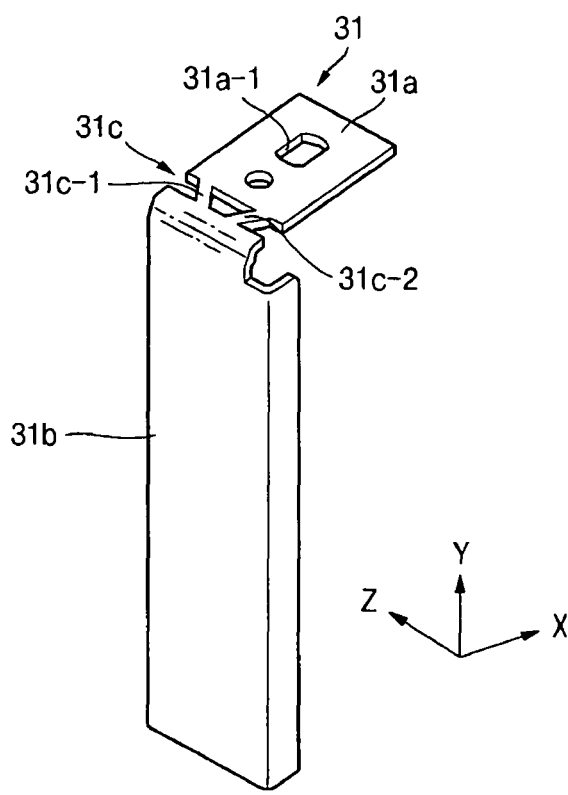
FIG. 3 illustrates a perspective view of a positive electrode lead tab according to an embodiment.

FIG. 3 illustrates a detailed, perspective view of the first electrode lead tab 31. As the structure of the first electrode lead tab 31 may be the same as that of the second electrode lead tab 32, only the structure of the first electrode lead tab 31 will be described hereinafter. It is noted that "first electrode tab 31" and "positive electrode tab 31" may be used hereinafter interchangeably.

As illustrated in FIG. 3, the positive electrode tab 31 may include the terminal junction part 31a, the electrode assembly-junction part 31b, and the fuse part between the terminal junction part 31a and the electrode assembly-junction part 31b. The fuse part 31c may have a width, i.e., a distance as measured along the z-axis, which is smaller than those of the terminal junction part 31a and the electrode assembly-junction part 31b.

The terminal junction part 31a may electrically contact the first terminal 21, and may have a terminal-inserting hole 31a-1 formed therethrough. As illustrated in FIG. 2, a lower portion of the first terminal 21 may be inserted into the terminal-inserting hole 31a-1, so a portion 21a of the first terminal 21 may be on, e.g., directly on, the terminal junction part 31a. The terminal junction part 31a coupled to the lower portion of the first terminal 21 via the terminal-inserting hole 31a-a may be received in a lower insulating member 34 disposed below the cap plate 28.

The electrode assembly-junction part 31b of the positive electrode lead tab 31 may extend from the terminal junction part 31a at a predetermined angle, e.g., at about 90°, with respect to the terminal junction part 31a. The electrode assembly-junction part 31b may be electrically connected to the positive electrode non-coating portions 11a. For example, the electrode assembly-junction part 31b may be attached to the positive electrode non-coating portions 11a through a welding process. It is noted that while a majority of the electrode assembly-junction part 31b may extend along the y-axis to contact the positive electrode non-coating portions 11a, a portion of the electrode assembly-junction part 31b may extend in the xz-plane to facilitate connection with the terminal junction part 31a.

As illustrated in FIGS. 2 and 3, the fuse part 31c of the positive electrode lead tab 31 may be formed between, e.g., directly between, the terminal junction part 31a and the electrode assembly-junction part 31b. For example, as illustrated in FIG. 3, the fuse part 31c may be formed on a region of the terminal junction part 31a, e.g., along the x-axis in the xz-plane, adjacent to the electrode assembly-junction part 31b. For example, the fuse portion 31c may be integral with the terminal junction part 31a and the electrode assembly-junction part 31b.

As illustrated in FIG. 2, the fuse part 31c may be disposed above the electrode assembly 10, e.g., the fuse part 31c may be between the cap plate 28 and the electrode assembly 10, and may be covered with the lower insulating member 34. Therefore, the fuse part 31c may not contact the electrolyte in the electrode assembly 10, and it may be possible to prevent the electrolyte from being ignited by heat generated in the fuse part 31c.

As illustrated in FIG. 3, the fuse part 31c of the positive electrode lead tab 31 may include a first bridging piece 31c-1 and a second bridging piece 31c-2. Each of the first bridging piece 31c-1 and second bridging piece 31c-2 may extend, e.g., along the x-axis, between the terminal junction part 31a and the electrode assembly-junction part 31b. That is, one end of each of the first and second bridging pieces 31c-1 and 31c-2 may be connected to the terminal-junction part 31a, and the other end may be connected to the electrode assembly-junction part 31b. Each of the first and second bridging pieces 31c-1 and 31c-2 may have a predetermined width along the z-axis, and a space may be formed in the xz-plane between the first and second bridging pieces 31c-1 and 31c-2. It is noted that a total sum of widths of the first and second bridging pieces 31c-1 and 31c-2 may be smaller than a width of each of the terminal junction part 31a and the electrode assembly-junction part 31b.

Figure 4:
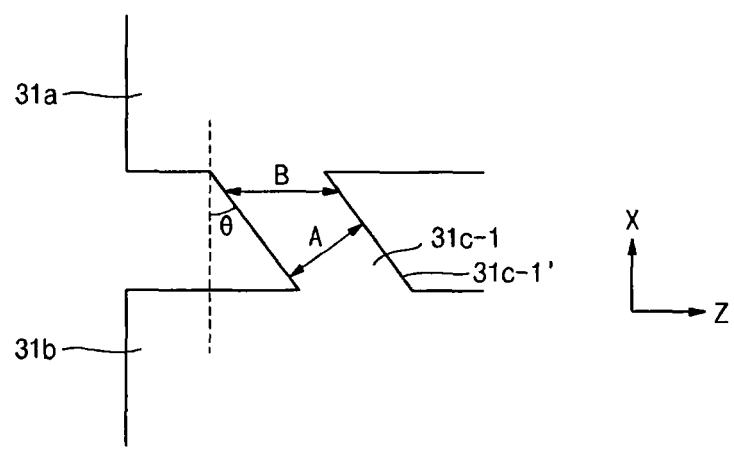
FIG. 4 illustrates a detailed, enlarged view of one connecting piece in the electrode lead tab of FIG. 3.

An extension direction of each of the first and second bridging pieces 31c-1 and 31c-2 may be at a predetermined angle other than 0° with respect to a longitudinal extension line of the terminal junction part 31a, e.g., angle θ in FIG. 4. For example, as illustrated in FIG. 4, the first bridging piece 31c-1 may be in the zx-plane at angle θ with respect to the x-axis. For example, an extension direction of the first bridging piece 31c-1 may differ from that of the second bridging piece 31c-2.

For example, as illustrated in FIG. 3, the first bridging piece 31c-1 may extend from a central portion of an edge of the electrode assembly-junction part 31b toward a peripheral portion of an edge of the terminal junction part 31a. The second bridging piece 31c-2 may extend from the central portion of the edge of the electrode assembly-junction part 31b toward a second peripheral portion, i.e., opposite to the first peripheral portion, of the edge of the terminal junction part 31a. It is noted that other configurations of the first and second bridging pieces 31c-1 and 31c-2 are included within example embodiments, e.g., the first bridging piece 31c-1 may extend from a central portion of the edge of the terminal junction part 31a toward a first peripheral portion of the edge of the electrode assembly-junction part 31b, the second bridging piece 31c-2 may extend from the central portion of the edge of the terminal junction part 31a toward a second peripheral portion (opposite to the first peripheral portion) of the edge of the electrode assembly-junction part 31b, etc.

FIG. 4 illustrates a detailed plan view of one bridging piece, e.g., the first bridging piece 31c-1, in FIG. 3. It is noted that FIG. 4 schematically illustrates a relation between a width of current path and a structural width of the bridging piece.

Referring to FIG. 4, the predetermined width, i.e., a structural width determining a mechanical strength of the bridging piece, of the first bridging piece 31c-1 may be measured along the z-axis, i.e., perpendicularly to a longitudinal direction of the terminal junction part 31a, and is indicated by "B" in FIG. 4. In other words, a length "B" that determined a mechanical strength against a lateral bending force may extend perpendicularly to an extension line of the longitudinal direction of the terminal junction part 31a. A current path through the first bridging piece 31c-1 may be perpendicular to both edges 31c-1' of the bridging piece 31c-1, i.e., an angle between a line along "A" and each edge 31c-1' of the first bridging piece 31c-1 may be about 90°, and a width of the current path may be indicated by "A" in FIG. 4. As further illustrated in FIG. 4, a length of the structural width "B" may be larger than the current path width "A".

When a bridging piece connecting a terminal junction part and an electrode assembly-junction part extends along the x-axis in parallel to the terminal junction part, a width of the current path of the bridging piece may be substantially the same as a structural width of the bridging piece. According to example embodiments, however, since the bridging piece 31c-1 is inclined with respect to the x-axis, i.e., at an angle other than 0°, the structural width "B" determining the mechanical strength (against the lateral bending force) may be larger than the current path width "A". In other words, when the bridging piece 31c-1 and a linear bridging piece, i.e., non-inclined, have a substantially same current path width, the bridging piece 31c-1 may have a larger structural width "B" than the linear bridging piece. It is noted that the fuse part 32c of the negative electrode lead tab 32 may have a substantially same structure as the fuse part 31c described above with respect to the structural width and current path width.

As the bridging pieces 31c-1 and 31c-2 of the fuse part 31c have a relatively narrow current path width, the fuse part 31c may be quickly melted when high current flows therethrough, thereby interrupting current flow through the lead tab 31. Further, while the current path width of the fuse part 31c is maintained to be narrow, the larger structural width "B" of the bridging pieces 31c-1 and 31c-2 may increase the mechanical strength of the fuse part 31c against a lateral bending force, so application of an unintentional external force to the positive electrode lead tab 31 may not modify or damage a shape of the positive electrode lead tab 31, e.g., a shape of the fuse part 31c.

In detail, in a conventional secondary battery, i.e., a secondary battery without a fuse part 31c and/or 32c according to example embodiments, when a pressure in the battery case is increased, a curved central portion of the shorting member may deform, e.g., from a convex structure to a concave structure, to contact the first shorting tab. Accordingly, the first shorting tab and the cap plate may be electrically connected to each other via the shorting member. However, since the electrical connection between the first shorting tab and cap plate may melt the shorting member due to the large current therethrough, the electrical connection between the first shorting tab and the cap plate may not be maintained, thereby eliminating a mechanism for regulating increased temperature or pressure in the battery. In other words, a risk of explosion or ignition in the battery may increase when charge/discharge processes are repeatedly performed in a state where the internal pressure and temperature in the case are increased, e.g., due to generation of excessive heat or a decomposition of electrolyte.

However, in the secondary battery 100 according to example embodiments, when the first shorting tab 41 and the cap plate 28 are electrically connected to each other via the shorting member 43, a large current may flow through the positive electrode lead tab 31 and the negative electrode lead tab 32. Due to the large current, at least one of the fuse parts 31c and 32c, e.g., the bridging pieces 31c-1 and 31c-2 that have a relatively narrow current path width, may melt, so a current flow among the first and second terminals 21 and 22 and the electrode assembly 10 is shut off. As such, an operation of the secondary battery 100 may be halted before reaching a dangerous state. Consequently, stability and safety of the secondary battery 100 may be enhanced.

It is noted that although the fuse parts 31c and 32c are formed on respective positive electrode lead tab 31 and negative electrode lead tab 32 of the secondary battery 100, example embodiments are not limited thereto. For example, the fuse part including the inclined bridging pieces may be formed on only one of the positive and negative electrode lead tabs 31 and 32 without changing the effect and performance caused by formation of both fuse parts 31c and 32c on the electrode lead tabs 31 and 32, respectively.

Figure 5:
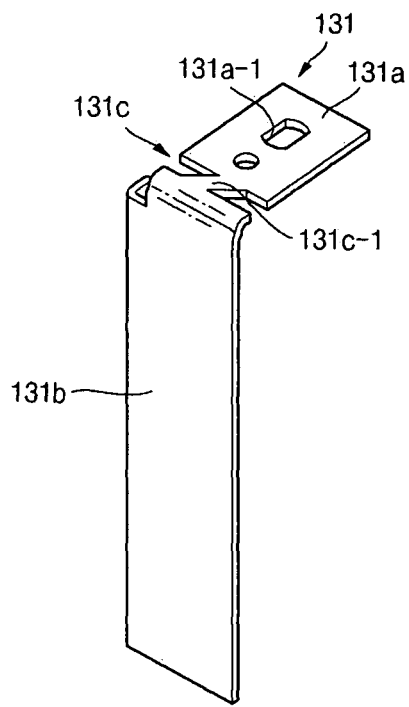
FIG. 5 illustrates a perspective view of a positive electrode lead tab according to another embodiment.

FIG. 5 illustrates a perspective view of a positive electrode lead tab 131 according to another embodiment. The positive electrode lead tab 131 may include a terminal junction part 131a, an electrode assembly-junction part 131b extended from the terminal-junction part 131a, and a fuse part 131c between the terminal-junction part 131a and the electrode assembly-junction part 131b. The positive electrode lead tab 131 may be substantially the same as the positive electrode lead tab 31 described previously with reference to FIGS. 1-4, with the exception of having a single bridging piece in the fuse part 131c.

In detail, the fuse part 131c of the positive electrode lead tab 131 may include a bridging piece 131c-1 connecting the terminal junction part 131a and the electrode assembly-junction part 131b. That is, the fuse part 131c may include only one bridging piece 131c-1. The bridging piece 131c-1 may have a width, i.e., a structural width along the z-axis, which is smaller than those of the terminal junction part 131a and the electrode assembly-junction part 131b.

The bridging piece 131c-1 may be inclined at a predetermined angle, i.e., other than 0°, with respect to a longitudinal extension line of the terminal junction part 131a. In other words, the bridging piece 131c-1 may extend diagonally between the terminal junction part 131a and the electrode assembly-junction part 131b. A function of the bridging piece 131c-1 of the fuse part 131c is the same as that of the bridging piece 31c of the fuse part 31c shown in FIG. 3 and FIG. 4, so a detailed description thereof will not be repeated.

Figure 6A:
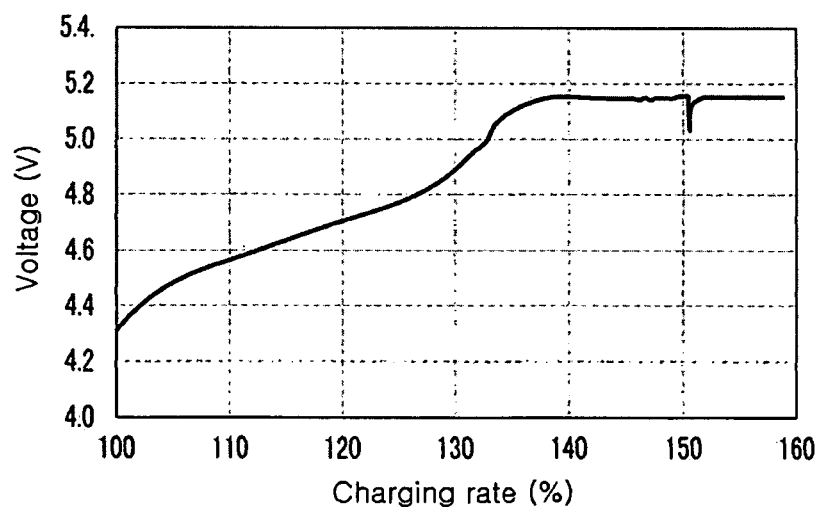
FIG. 6A illustrates a graph showing a variation of voltage in a comparative secondary battery.
Figure 6B:
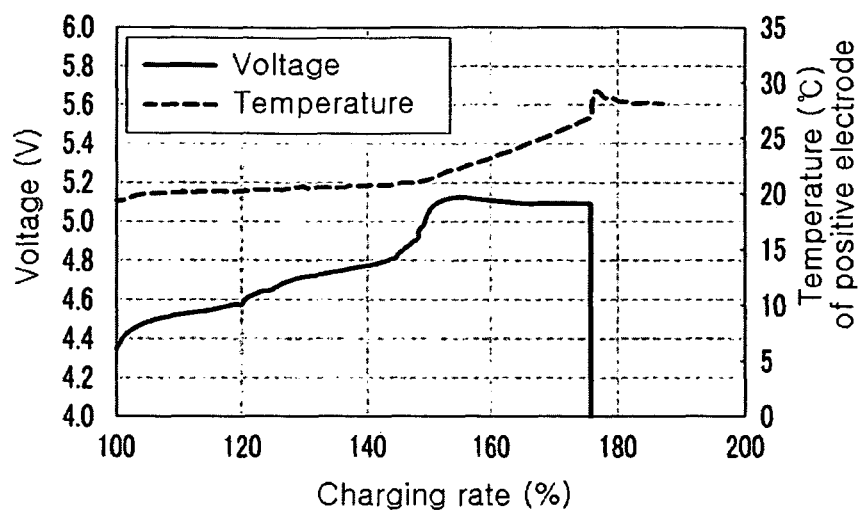
FIG. 6B illustrates a graph showing variation of voltage and temperature in a secondary battery according to an embodiment.

FIG. 6A illustrates a graph showing variation of voltage when a secondary battery includes a shorting member without a fuse part. FIG. 6B illustrates a graph showing variation of voltage and temperature of a secondary battery according to an example embodiment.

It is noted that both graphs in FIG. 6A and FIG. 6B illustrate variation of voltage when the secondary battery has a polygonal shape and an output voltage of 4.0 V. It is further noted that the secondary battery in FIG. 6A is designed to transform, i.e., deform, the shorting member at a charging rate of 150% or more, and the secondary battery according to example embodiments in FIG. 6B is designed to transform the shorting member at a charging rate of about 170% to about 180%.

As illustrated in FIG. 6A, after the shorting member is melted, i.e., indicated by the negative voltage spike in the graph at the charging rate of about 150%, voltage and overcharge continues to increase after a generated short almost immediately due to melting of the short member. As illustrated in FIG. 6B, however, when the fuse part of the electrode lead tab according to example embodiments melts, i.e., at about a charging rate of about 175%, no voltage increase or overcharge occurs after a generated short.

According to example embodiments, although the structural members are electrically connected to each other by an increased internal pressure, a flow of the excessive current may be shut off via a fuse part in a lead tab to prevent an explosion or an ignition within the battery. Further, the fuse part may have an increased structural width, while maintaining a narrow current path width. As such, the fuse part may exhibit an excellent mechanical strength against a lateral bending force, so it may be possible to prevent or substantially minimize deformation of the lead tab by an external force.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising;
   an electrode assembly in a case, the electrode assembly including a positive electrode, a negative electrode, and a separator between the positive electrode and the negative electrode;
   a cap assembly connected to the case, the cap assembly including a cap plate, at least one terminal through the cap plate, and a shorting member selectively connecting the terminal and the cap plate; and
   at least one electrode lead tab in the case, the electrode lead tab including:
   a terminal junction part electrically connected to the terminal,
   an electrode assembly junction part electrically connected to the positive or negative electrode in accordance with the terminal connected to the terminal junction part, and
   a fuse part electrically connected between the terminal junction part and the electrode assembly junction part, the fuse part extending at an oblique angle with respect to a longitudinal extension line of the terminal junction part and/or the electrode assembly junction part.

2. The secondary battery as claimed in claim 1, wherein the electrode assembly junction part and the terminal junction part are non-parallel.

3. The secondary battery as claimed in claim 1, wherein the fuse part is on a region of the terminal junction part adjacent to the electrode assembly junction part and is covered with an insulating member.

4. The secondary battery as claimed in claim 1, wherein the fuse part includes a first bridging piece and a second bridging piece.

5. The secondary battery as claimed in claim 4, wherein each of the first bridging piece and the second bridging piece is connected to the terminal junction part and the electrode assembly junction part, the first bridging piece and the second bridging piece extending in different directions.

6. The secondary battery as claimed in claim 4, wherein the first and second bridging pieces extend from a central portion of an edge of the electrode assembly-junction part to contact respective opposite sides of an edge of the terminal junction part.

7. The secondary battery as claimed in claim 4, wherein the first and second bridging pieces are spaced apart from each other and define an acute angel angle therebetween.

8. The secondary battery as claimed in claim 4, wherein the first and second bridging pieces extend from a central portion of an edge of the electrode assembly-junction part or from a central portion of an edge of the terminal junction part in different directions.

9. The secondary battery as claimed in claim 1, wherein the fuse part includes a single bridging piece.

10. The secondary battery as claimed in claim 9, wherein the bridging piece extends diagonally between the electrode assembly junction part and the terminal junction part.

11. The secondary battery as claimed in claim 1, wherein a structural width of the fuse part along a direction perpendicular to a longitudinal direction of the terminal-junction part is larger than a current path width of the fuse path.

12. The secondary battery as claimed in claim 1, wherein the fuse part is coplanar with the terminal junction part.

13. A secondary battery, comprising;
    an electrode assembly in a case, the electrode assembly including a positive electrode, a negative electrode, and a separator between the positive electrode and the negative electrode;
    a cap assembly connected to the case, the cap assembly including a cap plate, at least one terminal through the cap plate, and a shorting member selectively connecting the terminal and the cap plate; and
    at least one electrode lead tab in the case, the electrode lead tab including:
    a terminal junction part electrically connected to the terminal,
    an electrode assembly junction part electrically connected to the positive or negative electrode in accordance with the terminal connected to the terminal junction part, and
    an inclined fuse part electrically connected between the terminal junction part and the electrode assembly junction part, the fuse part including a first bridging piece and a second bridging piece inclined at an oblique angle with respect to longitudinal extension lines of the terminal junction part and/or the electrode assembly-junction part.

14. The secondary battery as claimed in claim 13, wherein the fuse part is on a region of the terminal junction part adjacent to the electrode assembly junction part and is covered with an insulating member.

15. The secondary battery as claimed in claim 13, wherein each of the first bridging piece and the second bridging piece is connected to the terminal junction part and the electrode assembly junction part, the first bridging piece and the second bridging piece extending in different directions.

16. The secondary battery as claimed in claim 13, wherein the first and second bridging pieces extend from a central portion of an edge of the electrode assembly-junction part toward respective opposite sides of an edge of the terminal junction part.

17. The secondary battery as claimed in claim 13, wherein the first and second bridging pieces extend from a central portion of an edge of the terminal junction part toward respective opposite sides of an edge of the electrode assembly junction part.

18. The secondary battery as claimed in claim 1, wherein the fuse part is configured to melt when high current flows therethrough.

19. The secondary battery as claimed in claim 1, wherein the cap plate includes at least first and second openings horizontally spaced apart from each other, the shorting member being in the first opening of the cap plate, and the at least one terminal extending through the second opening of the cap plate into an opening through the terminal-junction part.

* * * * *